United States Patent
Küspert et al.

(10) Patent No.: US 7,562,529 B2
(45) Date of Patent: Jul. 21, 2009

(54) INTERNAL COMBUSTION ENGINE HAVING AN EXHAUST GAS TURBOCHARGER AND AN EXHAUST GAS RECIRCULATION SYSTEM

(75) Inventors: Alfred Küspert, Ostfildern (DE);
Wolfram Schmid, Nürtingen (DE);
Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 146 days.

(21) Appl. No.: 11/707,770

(22) Filed: Feb. 16, 2007

(65) Prior Publication Data

US 2008/0000229 A1     Jan. 3, 2008

Related U.S. Application Data

(63) Continuation-in-part of application No. PCT/EP2005/008821, filed on Aug. 13, 2005.

(30) Foreign Application Priority Data

Aug. 18, 2004   (DE) .................... 10 2004 039 927

(51) Int. Cl.
*F02B 33/44* (2006.01)
*F02D 23/00* (2006.01)
*F02M 25/07* (2006.01)
*F02B 37/00* (2006.01)
*F02B 37/02* (2006.01)
*F02B 37/18* (2006.01)
*F02B 37/22* (2006.01)

(52) U.S. Cl. .................... 60/605.2; 60/602; 123/568.12

(58) Field of Classification Search .................... 60/602, 60/605.2; 123/568.12; *F02M 25/07; F02B 37/00, F02B 37/02, 37/18, 37/22*
See application file for complete search history.

(56) References Cited

U.S. PATENT DOCUMENTS

| | | | |
|---|---|---|---|
| 5,943,864 A | 8/1999 | Sumser et al. | 60/605.2 |
| 6,216,459 B1 | 4/2001 | Daudel et al. | 60/605.2 |
| 6,381,960 B1 | 5/2002 | Mardberg | 60/605.2 |
| 6,672,061 B2 * | 1/2004 | Schmid et al. | 60/605.2 |
| 7,051,527 B2 * | 5/2006 | Schmid et al. | 60/602 |
| 2005/0229597 A1 * | 10/2005 | Finger et al. | 60/602 |

FOREIGN PATENT DOCUMENTS

| | | | |
|---|---|---|---|
| CH | 537544 | * | 7/1973 |
| DE | 7605236 U | * | 6/1976 |
| DE | 197 40 609 A1 | * | 12/1998 |

(Continued)

*Primary Examiner*—Thai Ba Trieu
(74) *Attorney, Agent, or Firm*—Klaus J. Bach

(57) ABSTRACT

In a supercharged internal combustion engine having an intake duct and an exhaust gas recirculation system and comprising an exhaust gas turbine with two separate flow passages of different flow cross-sections arranged upstream of a turbine rotor of the exhaust gas turbine, each flow passage being in communication with a respective engine exhaust line for supplying it with exhaust gas and an exhaust gas recirculation line extending from one of the engine exhaust lines to the engine intake duct, a bypass line bypassing the exhaust gas turbine is provided and a common control element is arranged in the recirculation line of the exhaust gas recirculation system and in the bypass line for controlling the exhaust gas flow from the recirculation line selectively to none or any of the intake duct and the turbine bypass line.

12 Claims, 3 Drawing Sheets

FOREIGN PATENT DOCUMENTS

| | | |
|---|---|---|
| DE | 10132672 A1 * | 1/2003 |
| DE | 102 22 917 | 12/2003 |
| DE | 102 45 388 | 4/2004 |
| EP | 666440 A1 * | 8/1995 |
| WO | WO 99/35390 | 7/1999 |
| WO | WO 2004053310 A1 * | 6/2004 |
| WO | WO 2006018255 A1 * | 2/2006 |

* cited by examiner

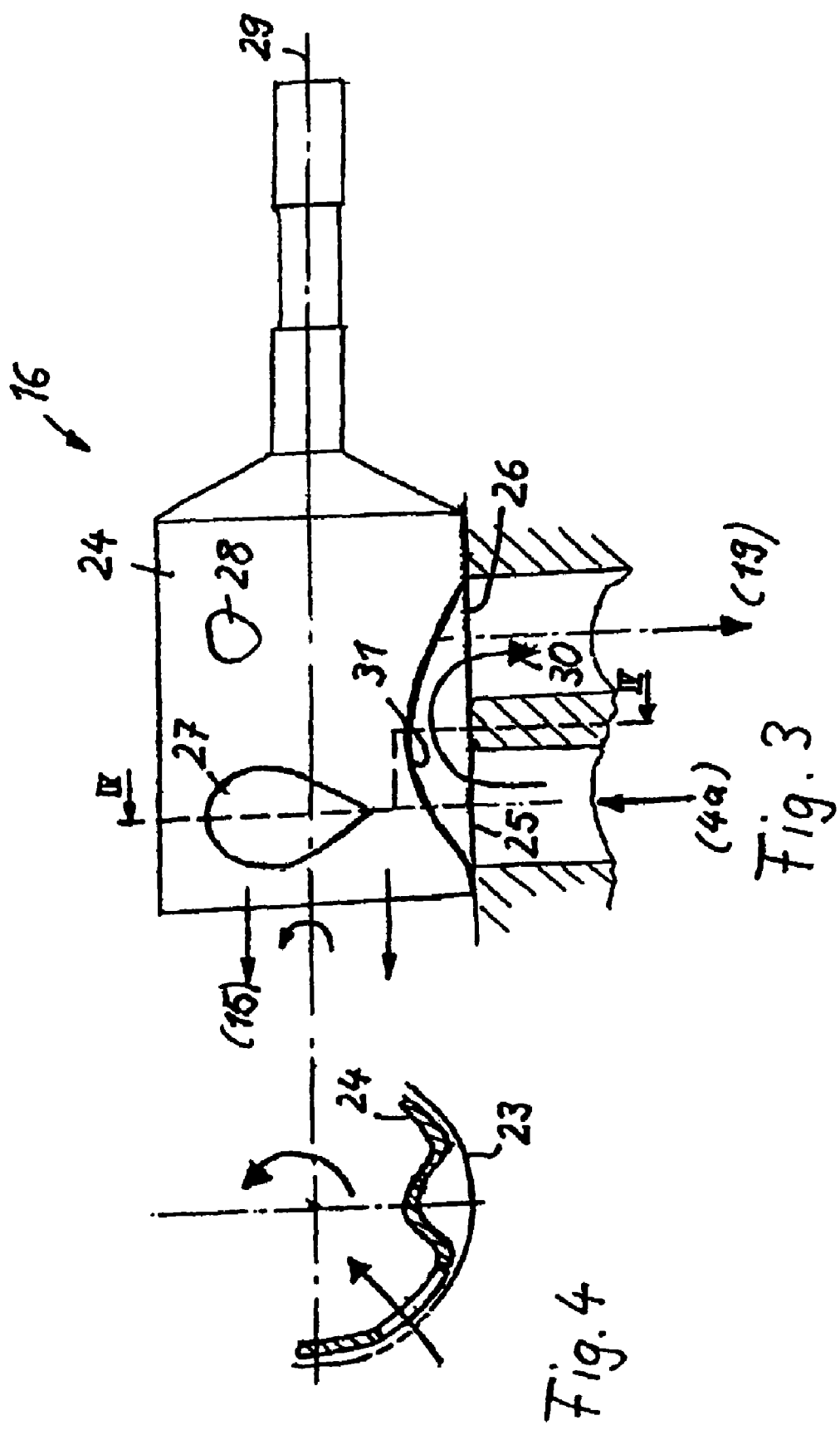

INTERNAL COMBUSTION ENGINE HAVING AN EXHAUST GAS TURBOCHARGER AND AN EXHAUST GAS RECIRCULATION SYSTEM

This is a Continuation-in-Part application of pending International Patent Application PCT/EP2005/008821 filed Aug. 13, 2005 and claiming the priority of German Patent Application 10 2004 039 927.1 filed Aug. 18, 2004.

BACKGROUND OF THE INVENTION

The invention relates to an internal combustion engine having an exhaust gas turbocharger and an exhaust gas recirculation system including a turbine with two separate inlet passages each connected to an engine exhaust line.

DE 102 45 388 A1 describes a supercharged internal combustion engine having an exhaust gas recirculation system. The exhaust gas turbine of the exhaust gas turbocharger has two flow passages with flow cross sections of different size, which are separated from one another by a dividing wall and are each supplied with exhaust gases from a respective cylinder bank of the internal combustion engine via separate exhaust lines. The different flow cross sections create a different pressure in the flow passages of the exhaust gas turbine. This pressure differential can be used to improve the exhaust gas recirculation by having a return line branching off from the exhaust line of the smaller flow passage, in which a higher pressure prevails, to the intake manifold, so that, particularly at low to medium loads and engine speeds of the internal combustion engine, exhaust gas from this exhaust line can be transferred into the intake manifold, where it is thoroughly mixed with the combustion air intake. This makes it possible to reduce the $NO_x$ emissions, especially during partial load operation of the engine.

The two exhaust lines between the two cylinder banks of the internal combustion engine and the flow passages of the exhaust gas turbine are connected to one another by a bypass line, in which a one-way flow valve is arranged, which will only allow an exhaust gas flow from the exhaust line of the larger flow passage towards the exhaust line of the smaller flow passage. Pressure pulses in the exhaust line of the larger flow passage, which briefly exceed the exhaust counter-pressure in the exhaust line of the smaller flow passage, can be used to transfer exhaust gas into the exhaust line of the smaller flow passage, with the result that the pressure level in this line can also be increased and an exhaust gas recirculation can be performed over larger operating ranges. The pressure regulation in order to prevent inadmissibly high pressures is achieved by means of a bypass line, which in bypassing the exhaust gas turbine branches off from the exhaust line of the smaller flow passage and which can be adjusted by way of a controllable shut-off valve.

Based on the state of the art, it is the object of the present invention to facilitate exhaust gas recirculation over wide operating ranges by means of simple design measures. At the same time, it is intended to provide an effective overload protection, especially in the upper load and engine speed range, both in fully firing drive operation and in engine-braking operation.

SUMMARY OF THE INVENTION

In a supercharged internal combustion engine having an intake duct and an exhaust gas recirculation system and comprising an exhaust gas turbine with two separate flow passages of different flow cross-sections arranged upstream of a turbine rotor of the exhaust gas turbine, each flow passage being in communication with a respective engine exhaust line for supplying it with exhaust gas and an exhaust gas recirculation line extending from one of the engine exhaust lines to the engine intake duct, a bypass line bypassing the exhaust gas turbine is provided and a common control element is arranged in the recirculation line of the exhaust gas recirculation system and in the bypass line for controlling the exhaust gas flow from the recirculation line selectively to none or any of the intake duct and the turbine bypass line.

According to the invention, the valve in the return line and the valve in the bypass line are combined into one common adjusting element, which is situated both in the flow path of the return line and in the flow path of the bypass line and which can assume at least three different positions. In a first position, both the recirculating line and the bypass line are shut off; the adjusting element assumes this position especially in the engine braking phase. In a second position, the recirculating line is opened and the bypass line is shut off; this position is suitably assumed in normal power drive operation, in which recirculation of exhaust gas into the intake manifold is desirable for the purpose of $NO_x$ reduction, but high component stresses are not yet to be expected. In a third position, both the recirculation line and the bypass line are opened; the adjusting element may assume this position particularly in the upper engine speed range under high load, when gas is recirculated directly from the exhaust line into the intake line for the purpose of $NO_x$ reduction, while exhaust gas is the released via the bypass line to the exhaust line to prevent any overstressing of components.

It may be advisable to provide a further adjustment position for the adjusting element, in which the recirculation line is shut off and the bypass line is opened. This additional position may be assumed, in particular, during high load engine operation and high engine speeds with all cylinders firing, where a high exhaust gas counter-pressure prevails in the exhaust lines. Such an adjustment position might also be necessary in engine-braking operation, however.

The common adjusting element makes it possible to adjust both the exhaust gas recirculation rate and the pressure level in the exhaust line by means of just one component. Accordingly, this also means that only one actuator is needed for actuation of the adjusting element. A compact arrangement can moreover be achieved, since, in contrast to embodiments in the state of the art, a separate shut-off valve is not needed.

In a particular embodiment, a bypass line is provided between the two exhaust lines upstream of the exhaust gas turbine, via which pressure can be transmitted, especially from the exhaust line of the larger flow passage to the exhaust line of the smaller flow passage. Although a lower pressure level fundamentally prevails in the larger flow passage, transient pressure pulses can occur in the exhaust line of the larger flow passage, which can be transmitted via the bypass line into the exhaust line of the smaller flow passage, where they can lead to a rise in the pressure level.

In an advantageous embodiment, a baffle device is provided, by way of which the exhaust line assigned to the larger flow passage can be selectively connected either to the bypass line or to the larger flow passage. This provides for an additional degree of freedom or a further adjustment capability so that, on the one hand, the range of application for the exhaust gas recirculation during high power engine operation can be enlarged, whilst, on the other hand, the engine braking performance can be increased. If the baffle device is switched to a position in which the exhaust line from the second cylinder bank is connected to the bypass line, the exhaust gases from both cylinder banks of the internal combustion engine are fed into the exhaust line of the smaller flow passage, which leads to a significant increase in the exhaust gas back-pressure in this line section. This greater exhaust gas back-pressure in turn permits exhaust gas recirculation over a wider working or operating range of the internal combustion engine and increased engine braking performance in non-firing operation.

The exhaust gas turbine may be equipped with a variable turbine geometry, which serves to adjust the effective turbine inlet flow cross section as a function of state and operating variables of the internal combustion engine. The variable turbine geometry takes the form, for example, of a guide vane system, which is arranged in the turbine inlet cross section—at the transition between the flow passages and the turbine rotor—or which can be inserted therein. The guide vane system may be an axially adjustable vane structure or an axially fixed vane structure with adjustable guide vanes.

The invention will become more readily apparent from the following description of advantageous embodiments thereof on the basis of the accompanying drawings:

BRIEF DESCRIPTION OF THE DRAWINGS

FIG. 3 is a schematic representation of a rotary slide valve, and FIG. 4 is a sectional view taken along line IV-IV in FIG. 3.

DESCRIPTION OF PREFERRED EMBODIMENTS

Figure 1:
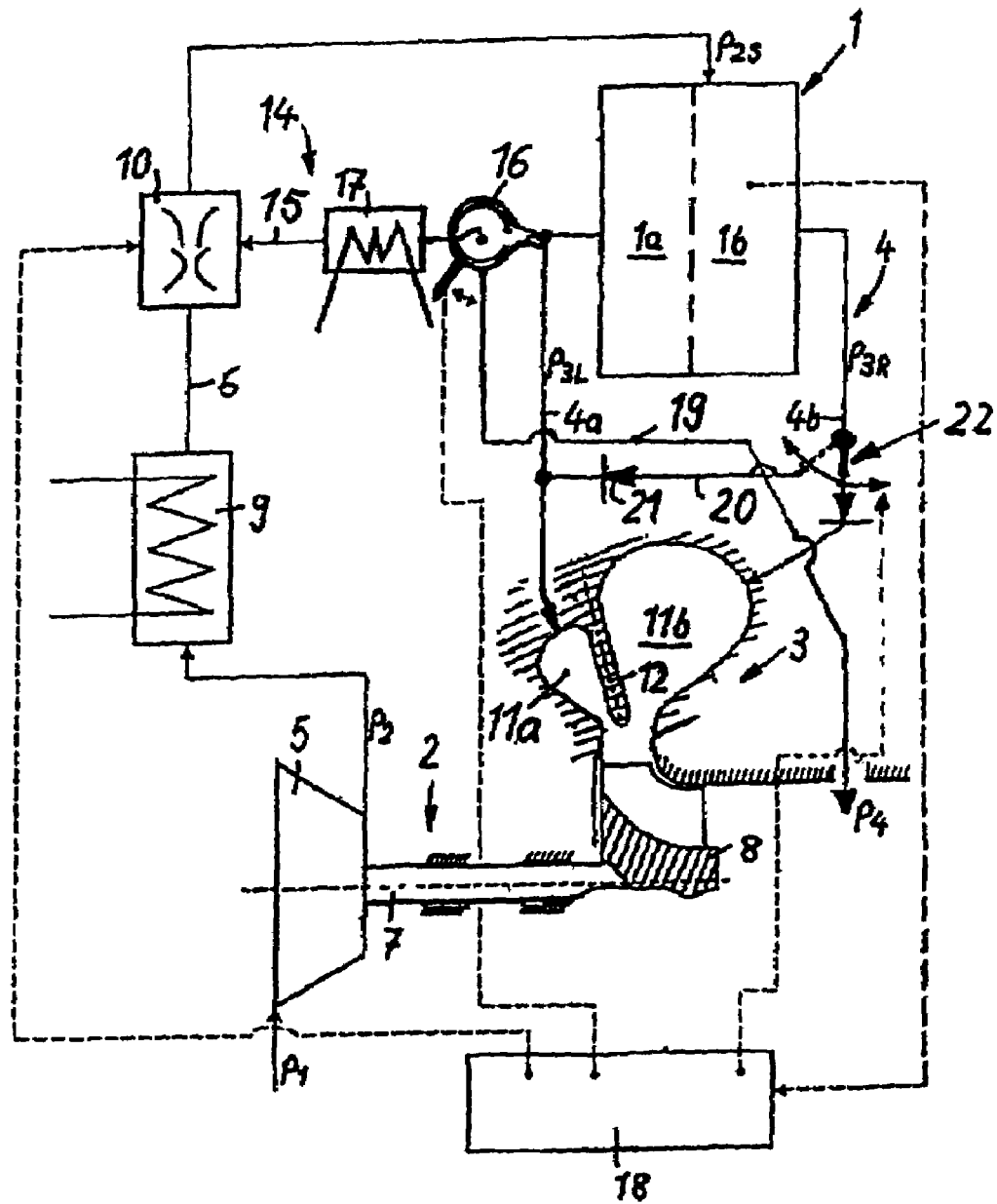
FIG. 1 shows schematically a supercharged internal combustion engine with an exhaust gas recirculation system, the exhaust gas turbine of the exhaust gas turbocharger being equipped with two flow passages, which are each supplied with exhaust gases from a respective cylinder bank of the internal combustion engine via an exhaust line, with an adjusting element in the form of a rotary slide valve, by means of which the exhaust gas recirculation rate and the exhaust gas back-pressure in one exhaust tract can be adjusted, and with a baffle device, by means of which the exhaust gases from the second cylinder bank can be transferred from the first cylinder bank to the exhaust tract.

In the figures, identical components are indicated by the same reference numerals.

The internal combustion engine 1 represented in FIG. 1, which is a spark-ignition engine or a diesel engine, is provided with exhaust-driven turbocharging. It includes an exhaust gas turbocharger 2 comprising an exhaust gas turbine 3 in the exhaust line 4 and a compressor 5 in the intake line 6 of the internal combustion engine 1. A turbine rotor 8, which is driven by the pressurized exhaust gases from the internal combustion engine 1, is rotatably arranged in the exhaust gas turbine 3. The rotational movement of the turbine rotor 8 is transmitted via a shaft 7 to a compressor wheel in the compressor 5, which draws in ambient air at the atmospheric pressure $p_1$ and compresses it to the increased pressure $p_2$. In the intake manifold 6 downstream of the compressor 5, the combustion air at the increased pressure $p_2$ is fed to an air intercooler 9 where it is cooled. In the exemplary embodiment, a flow control device 10, which serves to adjust the through-flow of combustion air, is arranged down-stream of the air intercooler 9. The combustion air at the boost pressure $p_{2S}$ is then fed to the cylinders of the internal combustion engine 1.

The internal combustion engine 1 has two cylinder banks 1a and 1b. The exhaust gases from each of which are collected in exhaust lines 4a and 4b respectively, which together form the exhaust manifold 4. The exhaust lines 4a and 4b connect the cylinder banks 1a and 1b to flow passages 11a and 11b respectively of the exhaust gas turbine 3. The two flow passages 11a and 11b in the exhaust gas turbine 3 are separated by a dividing wall 12 and have flow cross sections of different size for accommodating different flow volumes. The smaller flow passage 11a is supplied by the first exhaust line 4a with exhaust gas providing for a back-pressure $p_{3L}$, whereas the larger flow passage 11b is supplied via the exhaust line 4b with the exhaust gas from the cylinder bank 16 providing for a back-pressure $p_{3R}$. The pressure $p_{3L}$ prevailing in the smaller flow passage 11a exceeds the pressure $p_{3R}$ in the larger flow passage 11b.

In addition, an exhaust gas recirculation system 14 is provided between the exhaust manifold 4 upstream of the exhaust gas turbine 3 and the intake manifold downstream of the air intercooler 9. The exhaust gas recirculation system 14 comprises a recirculation line 15, which branches off from the first exhaust line 4a and extends to the intake manifold 6 via the flow control device 10. An adjusting element 16, which serves to adjust the through-flow or the exhaust gas recirculation rate, is arranged in the return line 15. Also situated in the return line 15 downstream of the adjusting element 16 is an exhaust gas recirculation cooler 17. The adjusting element 16 is of a rotary valve, the construction of which is described in more detail in FIGS. 3 and 4.

Branching off from the adjusting element 16 is a bypass line 19, which provides a flow path from the first exhaust line 4a, bypassing the exhaust gas turbine 3 in the exhaust line downstream of the exhaust gas turbine. The adjusting element 16 can be switched into a position in which the exhaust gases from the first cylinder bank 1a can be led off directly via the bypass line 19, bypassing the exhaust gas turbine 3. Downstream of the exhaust gas turbine 3, the exhaust gases have the expanded pressure $p_4$.

Lying between the exhaust lines 4a and 4b upstream of the exhaust gas turbine 3 is a bypass line 20, including a one-way flow valve 21, which will only allow a flow from the second exhaust line 4b, which is assigned to the larger flow passage 11b, to the first exhaust line 4a, which is assigned to the smaller flow passage 11a. The flow control valve 21 is suitably a passive valve, such as a flap check valve. An actively adjustable valve, which in addition to the one-way check valve can also be set to a position fully opening the bypass line 20 or a position completely closing the latter, is also feasible, however. However, in an alternative embodiment, no flow valve 21 is provided.

A baffle device 22, which can be adjusted between a first position in which a through-flow to the turbine inlet passage 11b is established, and a second position, in which a connection is established to the turbine inlet passage 11a via the bypass line 20, is incorporated into the second exhaust line 4b.

A control unit 18 serves to adjust all adjustable units, such as the baffle device 22, the adjusting element 16 and the flow control device 10, as a function of state and operating variables of the internal combustion engine. Where necessary, the adjustment of a variable turbine geometry in the exhaust gas turbine and of the flow valve 21 in the bypass line 20 between the exhaust lines 4a and 4b is also feasible, provided that the flow valve 21 is an actively adjustable valve.

In fully firing drive operation of the internal combustion engine 1, that is, when all cylinders are operating, exhaust gas can be conducted out of the exhaust manifold via the exhaust gas recirculation system 14 into the intake manifold in order to reduce the $NO_x$ emissions. For this purpose, the control element 16 is set to a position opening the return line 15, so that the exhaust gas present in the first exhaust line 4a from the first cylinder bank 1a can pass via the adjusting element 16 and the return line 15 into the intake manifold. In this load and engine speed range, the adjusting element 16 is suitably situated in a position closing the bypass line 19, so that an exhaust gas fraction is returned into the intake manifold 6 only according to the actual setting of the adjusting element 16, and the remaining exhaust gas fraction from the first cylinder bank 1a is delivered to the exhaust gas turbine 3 via the exhaust line 4a of the smaller flow passage 11a.

To assist the exhaust gas recirculation, the baffle device 22 can be set to a position in which the second exhaust line 4b is connected to the bypass line 20, so that in higher pressure phases the exhaust gases from the second cylinder bank 1b are conducted via the bypass line 20 into the first exhaust line 4a, increasing the exhaust gas backpressure there. In order to prevent overstressing of the components, it may be appropriate to set the control element 16 to a position in which although the return line 15 is still opened, the bypass line 19 is also simultaneously opened, so that no harmful peak pressures occur in the first exhaust line 4a.

As a further position, the control element 16 can be set in such a way that both the recirculation line 15 and the bypass line 19 are shut off. In this case, no exhaust gas recirculation occurs from the exhaust manifold into the intake manifold. Instead, all the exhaust gas is delivered to the exhaust gas turbine 3, providing an additional possibility for adjustment in which the baffle device 22 can either be shifted into a position in which the exhaust gases from the second cylinder bank 1b are delivered to the second flow passage 11b, or can be set to a position in which the exhaust gases from the second cylinder bank 1b are delivered to the first exhaust line 4a via the bypass line 20.

Also feasible is an embodiment in which the exhaust gas turbine 3 is equipped with a variable turbine geometry, by means of which the effective turbine inlet cross section can be adjusted as a function of state and operating variables. By means of the variable turbine geometry, the effective turbine inlet cross section can be adjusted between a minimum opening choke position and a maximum opening position. The variable turbine geometry may serve to boost the performance both in fully firing drive operation and also in engine-braking operation.

Figure 2:
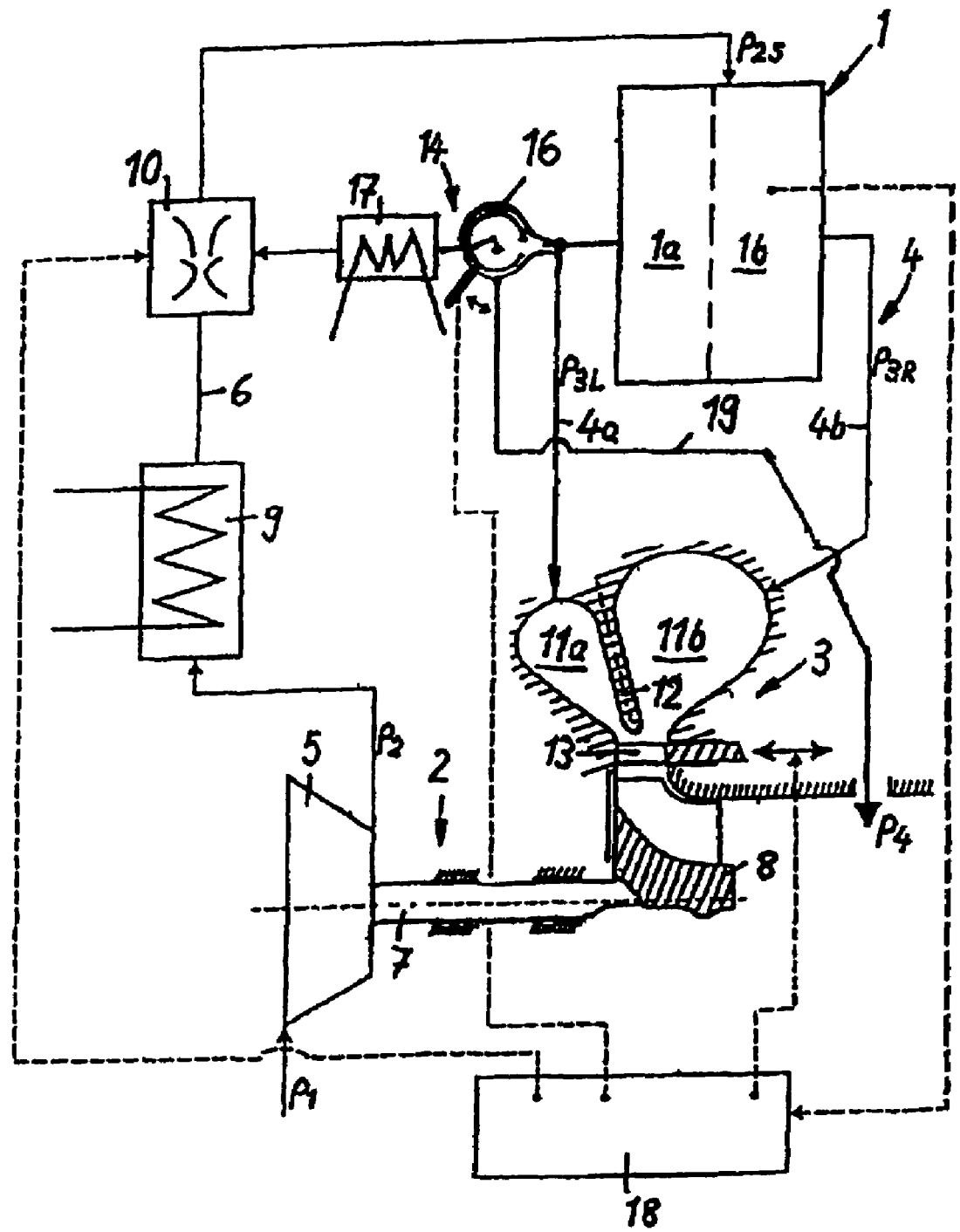
FIG. 2 shows an internal combustion engine comparable to FIG. 1, but without a baffle device.

The exemplary embodiment according to FIG. 2 differs from the preceding exemplary embodiment in that no bypass line is provided between the two exhaust lines 4a and 4b upstream of the exhaust gas turbine 3. Accordingly, there is also no baffle device serving selectively to deliver the exhaust gas from the second exhaust line 4b either to the first exhaust line 4a or to the second flow passage 11b.

On the other hand, the exhaust gas turbine 3 is equipped with a variable turbine geometry 13, which in the exemplary embodiment shown takes the form of an axially adjustable guide vane structure, which can be moved into and out of the flow inlet cross section, and via which the flow passages 11a and 11b communicate with the turbine rotor 8.

Otherwise, the construction and the operating principle correspond to that of the preceding exemplary embodiment.

FIGS. 3 and 4 represent the control element 16, which in the exemplary embodiment is of a rotary valve, which is capable of rotating about its valve body longitudinal axis 29 for adjustment to the various valve positions. The control element 16 comprises a hollow cylindrical valve body 24, which is rotatably supported in a valve housing 23 and into the outer shell of which includes two communication apertures 27 and 28, which can be brought to coincide with flow apertures 25 and 26 by the rotation of the valve body about the valve body longitudinal axis 29. The flow apertures 25 and 26 open out radially onto the peripheral surface of the valve body 24, the first flow aperture 25 being assigned to the first exhaust line 4a (shown in brackets) and the second flow aperture 26 to the bypass line 19 (likewise shown in brackets). Also provided in the peripheral surface of the valve body 24 is a concave bypass recess 31, in the form of a recess in the peripheral surface which extends so far in an axial direction that, in a specific angular position of the valve body 24, the two flow apertures 25 and 26 communicate directly with one another. As a result, direct flow as indicated by the arrow 30 is facilitated from the first exhaust line 4a into the bypass line 19 via the flow aperture 25 and the other flow aperture 26. In this position of the adjusting element 16, the return line 15 (likewise shown in brackets), which communicates with the hollow cylindrical interior of the valve body 24, is shut off.

In another angular position of the valve body 24, the first communication aperture 27 coincides with the first flow aperture 25 of the exhaust line 4a. In this position, the second communication aperture 28 has not yet been adjusted to coincide with the other flow aperture 26. In this angular position, exhaust gas from the first exhaust line 4a can flow into the return line 15 via the flow aperture 25 and the communication aperture 27 coinciding therewith; at the same time, the bypass line 19 is shut off.

In another angular position, the communication aperture 27 coincides with the flow aperture 25, whilst the other communication aperture 28, which is smaller than the first communication aperture 27, also coincides with the second flow aperture 26. In this angular position of the valve body 24, both the return line 15 and the bypass line 19 are opened.

Finally, the valve body 24 can also assume a position in which all flow and communication apertures are closed, so that both the return line 15 and the bypass line 19 are shut off. The first exhaust line 4a, on the other hand, is opened in all positions of the valve body 24.

What is claimed is:

1. An internal combustion engine (1) including first and second groups of cylinders (1a, 1b), an exhaust gas turbocharger (2) and an exhaust gas recirculation system (14), the exhaust gas turbocharger (2) having an exhaust gas turbine (3) with a turbine rotor (8), separate first and second turbine flow passages (11a, 11b) of different flow cross-sections arranged upstream of the turbine rotor (8), each flow passage (11a, 11b) being in communication with a first and, respectively, second exhaust line (4a, 4b) for supplying exhaust gas from the internal combustion engine (1) to the exhaust gas turbine (3), a recirculation line (15) of the exhaust gas recirculation system (14) connecting the first exhaust line (4a) assigned to the smaller first flow passage (11a) to an intake line (6) of the internal combustion engine (1) via an adjustable valve (16) arranged in the recirculation line (15), a bypass line (19), which bypasses the exhaust gas turbine (3) extending from the adjustable valve (16) to a turbine outlet, and a controller (18) for switching the adjustable valve (16), depending on engine operation into the following positions so as to minimize engine emissions:

the recirculation line (15) and the bypass line (19) shut off for directing all of the exhaust gas of the first group of cylinders (1a) to the first turbine inlet flow passage (11a) during braking operation of the engine, the recirculation line (15) opened in a controlled manner and the bypass line (19) shut off for directing the exhaust gas of the first group of cylinders (1a) to the first turbine inlet flow passage (11a) and to the intake line of the engine, during the normal operation of the engine, and the recirculation line (15) and the bypass line (19) opened in a controlled manner for recirculating part of the exhaust gas of the first group of cylinders to the engine (1), under high load operation of the engine, so as to provide an exhaust gas pressure in the recirculation line (15) sufficient for recirculating exhaust gas to the engine.

2. The internal combustion engine as claimed in claim 1, wherein the adjustable valve (16) is arranged in the branch of the recirculation line (15) extending from the exhaust line (4a) leading to the smaller flow passage (11a).

3. The internal combustion engine as claimed in claim 1, wherein the bypass line (19) branches off from the adjustable valve (16).

4. The internal combustion engine as claimed in claim 1, wherein the adjustable valve (16) is a rotary valve.

5. The internal combustion engine as claimed in claim 1, wherein the rotary valve comprises a rotatably supported, hollow cylindrical valve body (24) with a valve body housing having at least two communication apertures (27, 28), the valve body (24) being adjustable between at least two opening positions and one closed position, with a first opening position in which a first flow aperture (25), which is assigned to the first exhaust line (4a), is connected by way of the communication aperture (27) to a valve body interior, which communicates with the recirculation line (15), and, in the second opening position, the second communication aperture (28) additionally communicates with the second flow aperture (26), which is assigned to the bypass line (19).

6. The internal combustion engine as claimed in claim 1, wherein the adjustable valve (16) is additionally switchable into a position, in which the return line (15) is shut off and the bypass line (19) is opened for reducing back pressure in the first exhaust line (4a).

7. The internal combustion engine as claimed in claim 1, wherein the first and second exhaust lines (4a, 4b) are interconnected by a connecting line (20) upstream of the exhaust gas turbine (3).

8. The internal combustion engine as claimed in claim 7, wherein a one-way flow valve (21), which only permits a flow in the direction of the first exhaust line (4a) of the smaller flow passage (11a), is arranged in the connecting line (20).

9. The internal combustion engine as claimed in claim 7, wherein a baffle device (22), which selectively connects the second exhaust line (4b) either to the larger flow passage (11b) or to the connecting line (20), is arranged in the second exhaust line (4b) connected to the larger flow passage (11b).

10. The internal combustion engine as claimed in claim 1, wherein the exhaust gas turbine (3) is equipped with a variable turbine geometry (13) for the variable adjustment of the effective turbine inlet flow cross-section.

11. The internal combustion engine as claimed in claim 10, wherein the variable turbine geometry (13) is arranged in the turbine inlet flow cross-section of the smaller flow passage (11a).

12. The internal combustion engine as claimed in claim 10, wherein the variable turbine geometry (13) is arranged in the turbine inlet flow cross-section of the larger flow passage (11b).

* * * * *